Oct. 15, 1963 E. WILDHABER 3,106,867
MACHINE FOR CUTTING SPIRAL TEETH
Original Filed Jan. 3, 1956 3 Sheets-Sheet 1

INVENTOR:
Ernest Wildhaber

Oct. 15, 1963   E. WILDHABER   3,106,867
MACHINE FOR CUTTING SPIRAL TEETH
Original Filed Jan. 3, 1956   3 Sheets-Sheet 2

INVENTOR:
Ernest Wildhaber

Oct. 15, 1963     E. WILDHABER     3,106,867

MACHINE FOR CUTTING SPIRAL TEETH

Original Filed Jan. 3, 1956     3 Sheets-Sheet 3

*INVENTOR:*
Ernest Wildhaber

United States Patent Office 3,106,867
Patented Oct. 15, 1963

3,106,867
MACHINE FOR CUTTING SPIRAL TEETH
Ernest Wildhaber, Brighton, N.Y.
(124 Summit Drive, Rochester 20, N.Y.)
Original application Jan. 3, 1956, Ser. No. 557,151, now Patent No. 2,984,158, dated May 16, 1961. Divided and this application Jan. 16, 1961, Ser. No. 83,108
11 Claims. (Cl. 90—10)

The present invention relates to the production of spiral teeth on gears, particularly on spiral bevel and hypoid gears. This application is a division of my pending application Serial No. 557,151, filed January 3, 1956, now Patent No. 2,984,158, granted May 16, 1961, and is confined to the machine, which is disclosed in said pending application, for cutting spiral teeth on gears, particularly spiral bevels and hypoids.

By the term "spiral" is meant a general curve extending about an axis at varying distances therefrom, that is, at a distance which increases continuously from the inner end of the spiral to its outer end. It differs from a helix, which is a curve that has a constant distance from an axis.

It is conventional practice in the gear cutting art to form-cut the gear or larger member of a pair of spiral bevel or hypoid gears; but it has heretofore been necessary to generate the other member of the gear pair in order to produce teeth on it which are conjugate to the form-cut mating gear. Form-cutting is fasten than generating, and also has the advantage that it produces smoother fillets connecting the side profiles of the teeth with the bottoms of the tooth spaces. Heretofore, however, it has not been practical to form-cut both members of a pair of spiral bevel or hypoid gears.

One object of this invention is to provide a machine for form-cutting spiral teeth on spiral bevel and hypoid gears and pinions.

Another object of the invention is to provide a machine for form-cutting spiral teeth on spiral bevel and hypoid gears and pinions which is capable of doing so in an efficient and productive manner. To this end, it is a purpose of the invention to provide a machine that employs a plurality of tools which will operate simultaneously on a gear blank, and from at least three different points around the blank.

Still another object of the invention is to provide a machine of the character described in which the work support is rotated in time with the reciprocation of a tool slide in order to cut teeth of the desired shape on a gear blank, but which nevertheless will not require extensive timing trains, and which, therefore, will be of relatively simple construction.

Another object of the invention is to provide a machine of the character described for cutting spiral teeth from solid gear blanks.

Other objects of the invention will be apparent hereinafter from the specification, particularly when read in conjunction with the accompanying drawings, and from the recital of the appended claims.

Figure 1:
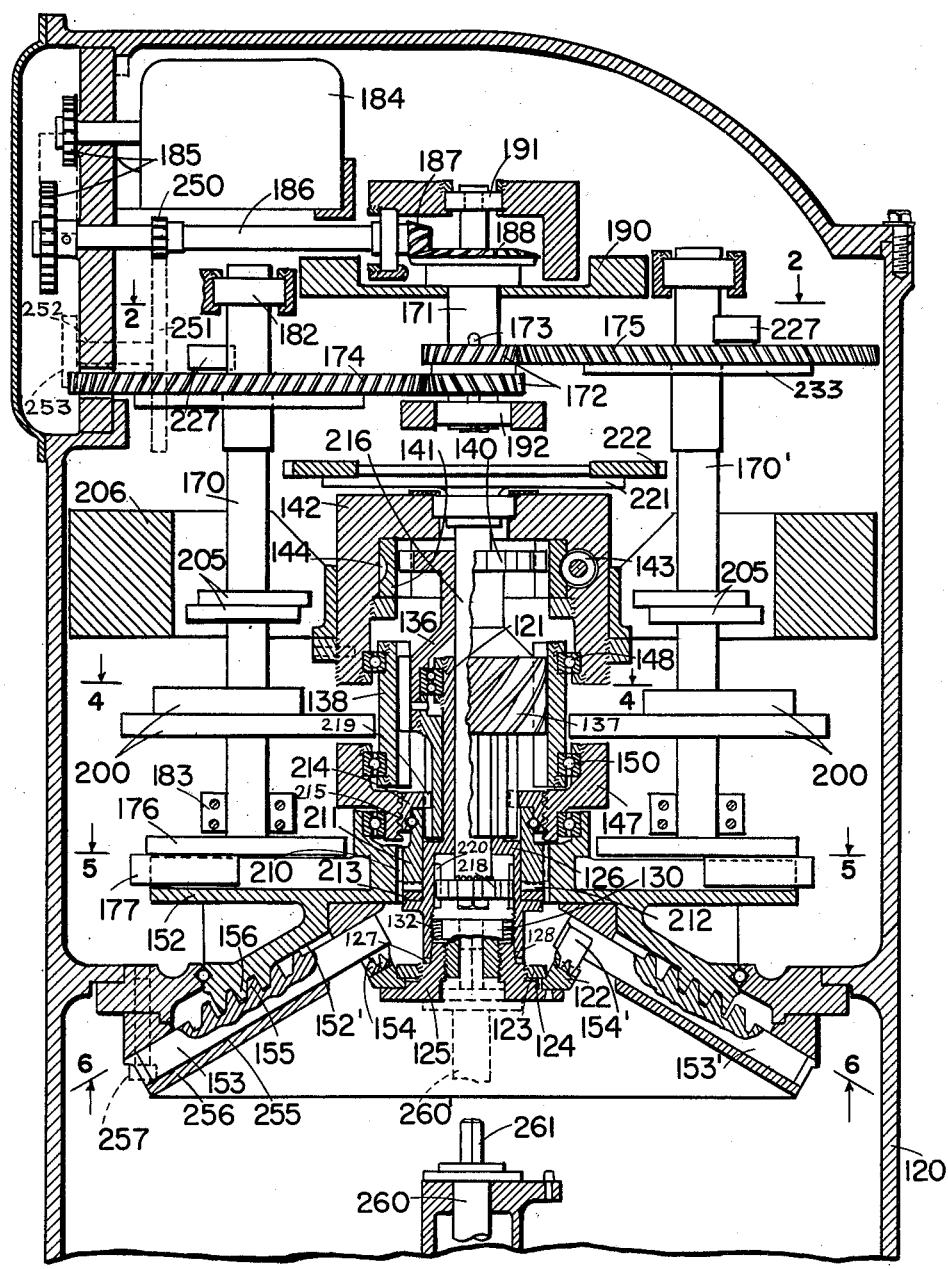
FIG. 1 is an axial sectional view of a machine built according to one embodiment of this invention for cutting the side surfaces of spiral teeth with form-cutting tools, the section being taken partly in an axial plane of the work spindle and partly through the offset ways of the tool slides.

In the machine of the present invention, the sides of the teeth of a hypoid or spiral bevel gear or pinion are cut by reciprocating a form-cutting tool across the face of the gear blank while the blank is simultaneously turned on its axis in direct proportion to the tool displacement. The form-cutting edge of the tool describes and cuts an entire tooth side in final feed position. The tools for cutting opposite sides of the teeth of at least one member of the gear pair have opposite side-cutting edges that are concave. They may be mounted on separate tool slides or may be mounted on the same tool slide. The profile curvature of the teeth, in sections normal to the pitch lines, should change lengthwise of the teeth. This change is achieved in the manner described in parent Patent No. 2,984,158 above mentioned. The curvature plane of the curved cutting edge of the tool is disposed at an angle to the tooth surface normal. This is attained by the use of curved, and preferably spherical cutting faces on the tools, the tools for cutting opposite sides of the teeth having convex and concave spherical cutting faces, respectively. The machine may be used for cutting hypoid or spiral bevel gears and pinions by moving the tool along a pitch line element of the gear or along a line inclined thereto.

A machine with a single tool slide may be used; or a machine may have two or more tool slides carrying tools cutting opposite sides of the teeth. The machine herein illustrated has many tool slides, whose tools act on a gear blank from at least three spaced points about the axis of the blank. Such a machine is suited especially for quantity production.

The machine illustrated may be used for cutting the larger member of a gear pair. Similar machines may be used for cutting the pinion of the gear pair if the pinion taper is sufficient. On slightly tapered pinions, a modified clapping motion should be provided, that is, a clapping motion more nearly perpendicular to the pitch surface of the pinion.

The machine illustrated has a frame 120 which is built about a centrally disposed work holder or spindle 121. The gear blank 122, which is to be cut, is rigidly secured to the spindle 121 by a nut 123 and a key 124. The work support 121 has an end part 125 at its lower end that holds the gear blank 122 and that is secured to the main part 126 of the spindle by a toothed coupling 127. A taper projection and bore 128 help in assembly of the work holder. The coupling is kept in rigid engagement by a bolt 130 that threads into the part 125, and that has another thread 132 of opposite hand which threads into the main part 126 of the work support. Thread 132 is an interrupted thread and so is the thread which it engages, so that the bolt 130 and part 125 can be advanced axially toward the region of their engagement without touching the threads. Engagement and tightening occurs when the bolt is turned about a quarter turn. Any other suitable known way of chucking may be used instead.

The axis of the work holder may be arranged either vertically or horizontally, but will be described specifically for a vertical arrangement. At its upper end, the work holder 121 is rotatably mounted in axially fixed position in a sleeve 136. This sleeve has an externally threaded portion 137 at one end which is of ample lead angle, and which engages matching internal threads provided in an oscillatory member 138. At its upper end the member 136 has peripherally arranged straight teeth 140, which engage matching internal teeth of a ring-shaped part 141. The part 141 is mounted in a stationary portion 142, and may be rotated by a worm 143, which engages worm gear teeth 144 provided on its periphery.

Worm 143 effects the depthwise feed motion axially of the work holder. As it turns very slowly in engagement with the worm gear 144, it rotates the hollow sleeve member 136. This member then moves axially in the oscillatory member 138 because of its threaded engagement with the member 138.

The oscillatory member 138 controls the clapping motion, which in this instance is in the direction of the axis of the work holder and is carried out by the work holder. A turning motion about the axis of the work holder may be added to the axial motion as will be described further hereinafter. The oscillatory member 138 is held in axially fixed position on the stationary parts 142 and 147 by the anti-friction bearings 148 and 150.

Another oscillatory member 152 effects the cutting motion. Like member 138, this member 152 is coaxial with the work spindle 121. Mounted on the member 152 is a plurality of reciprocatory tool slides 153, 153' that are movable on the member 152 in directions inclined to the axis of the work spindle. Cutting tools 154, 154' are rigidly secured to the slides 153, 153' adjacent the inner ends of the slides. Where bevel gears are to be cut, the extended path of each cutting edge intersects the axis of the work spindle. Where hypoid gears are to be cut, each tool slide moves along a path whose center line is offset from the axis of the work spindle.

The slides 153, 153' have teeth 155 that mesh with spiral teeth 156 provided on an internal conical portion 152' of the member 152. If desired, the member 152' may be made separate from the member 152 and may be made adjustable about the axis of the member 152.

Figure 6:
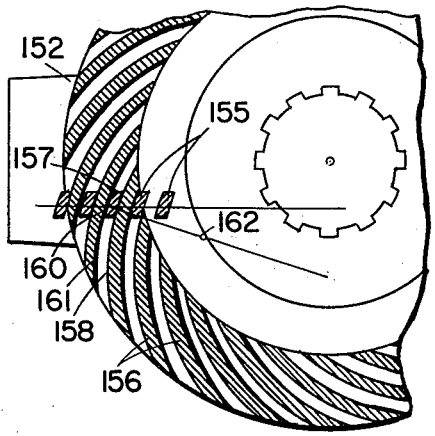
FIG. 6 is a fragmentary section looking in the direction of the arrows and taken in a surface of revolution containing lines 6—6 of FIG. 1.

The sides 157 (FIG. 6) of the teeth 155, which mesh with the convex sides 158 of the teeth 156, may be straight and have plane tooth surfaces. The opposite sides 160 of the teeth 155 are convex, and more curved than the mating concave sides 161 of the teeth 156. The curvature center of the sectional profile of a side 160 may be at 162. The tooth surfaces 160 may be parts of conical or spherical surfaces. The tooth surfaces of the spiral teeth 156 are conjugate thereto, and may be produced in a generating operation in which a milling cutter or grinding wheel represents a tooth side 157, 160, and the blank turns in engagement with the milling cutter or grinding wheel as if meshing with the teeth of the tool slide.

Oscillation of the member 152 causes reciprocation of the tool slides 153, 153'. Preferably, the teeth 155, 156 are designed so that the movements of the tool slides will be directly proportional to the oscillation of the member 152, that is, the slide displacement and the turning angle of member 152 are timed to be exactly proportional to each other.

Instead of using gear teeth to connect the tool slides and the oscillatory member 152, however, if the angular spacing of the tool slides permit, the connection may be made by rollers on the tool slides engaging cam tracks on the oscillatory member 152.

Since the cutting forces are applied at points spaced about the axis of the gear blank, they balance each other approximately, and only exert a turning moment on the gear blank. Preferably, the driving forces are also arranged to produce only a turning moment. This facilitates the mounting of the work spindle and favors accuracy by avoiding one-sided deflections of the load. To this end, a pair of drive shafts 170, 170' are provided, that are parallel to the axis of the work holder 121. These shafts are rotated through a shaft 171 which is coaxial with the work spindle 121. The drive shafts 170, 170' are rotatably mounted in bearings 182, 183 secured to a stationary part of the frame of the machine. The central shaft 171 is driven from a motor 184 through change gears 185, a shaft 186, a spiral bevel pinion 187, and a spiral bevel gear 188 that meshes with the pinion 187 and that is fixedly secured to the shaft 171. Also rigidly secured to the shaft 171 is a flywheel 190. Shaft 171 is rotatably mounted on bearings 191, 192 in a part of the machine that is fixed to the frame.

Mounted on the shaft 171 to rotate therewith is a herringbone pinion 172 that is free to move axially along the keyway 173. The lower half of the herringbone pinion 172 meshes with a helical gear 174 that is rigidly secured to the shaft 170. The upper half of the herringbone gear 172 meshes with a helical gear 175 that is rigidly secured to the shaft 170'. The helical gears 174, 175 are of opposite hands, as are the two halves of the pinion 172. In operation, the pinion 172 floats axially and thereby adjusts itself so that the opposite axial thrusts in its two regions of mesh are balanced. The tooth loads are then also balanced so that the pinion 172 transmits equal torques to the two gears 174, 175.

Figure 5:
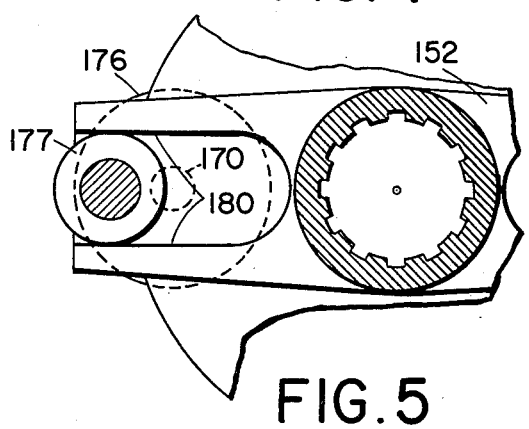
FIG. 5 is a fragmentary section taken on the line 5—5 of FIG. 1 looking in the direction of the arrows.

At the lower ends of the drive shafts 170, 170' are discs 176 which are integral with the shafts. A cylindrical roller 177 is mounted on each disc 176 in an eccentric position as shown in FIG. 5. Each roller 177 engages in a straight slot 180 in member 152 that extends radially of this member. As the rollers move bodily about the axes of their respective shafts 170, 170', they maintain engagement with the slots 180 and oscillate the member 152, thereby reciprocating the tool slides 153, 153'. If desired, the eccentricity of the rollers 177 may be adjustable.

To obtain spiral teeth on the gear blank, the work spindle must turn on its axis during the cut. In the machine of the present invention the work spindle turns with the oscillatory member 152 during the cutting stroke. The tooth shape is therefore defined by a single moving gear connection even though the tool slides move in different paths in directions at an angle to the axis of the work spindle. With this construction high accuracy is made possible since the varying inaccuracies and deflections under load of a timing train are avoided, and since backlash can more readily be eliminated.

Figure 4:
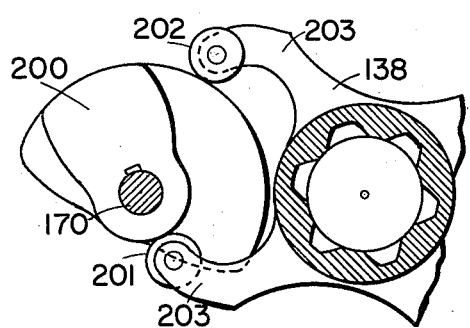
FIG. 4 is a fragmentary section taken along the line 4—4 of FIG. 1 looking in the direction of the arrows.

The driving connection of the shafts 170, 170' with the oscillatory member 138 is shown in FIGS. 1 and 4. It consists in each instance of a double cam 200 that engages rollers 201, 202 provided on arms 203 of the member 138. A cam 200 is rigidly secured to each of the shafts 170, 170'. FIG. 4 shows the member 138 in the dwell position corresponding to the middle of the cutting stroke.

Also secured to the shafts 170, 170' are double cams 205 (FIG. 1) that act on an oscillatory member 206 of substantial weight and inertia moment. This member is rotatably mounted to turn about the axis of the work spindle 121 and acts as mass-balance member. The cams 205 are designed to angularly accelerate the member 206 in a direction opposite to the angular acceleration of the working parts, including the members 138, 152, the work spindle, and the work piece. The product of the angular acceleration and the inertia moment should be equal and opposite on the member 206 and said working parts. This leaves only the axial clapping motion of the work spindle dynamically unbalanced. If desired, this can also be balanced by adding an axial displacement to the oscillation of the member 206.

The work spindle is indexed during each return stroke of the tool slides. During the cutting strokes the work spindle is rigidly connected to the oscillatory member 152 by a splined sliding coupling 210 which connects the member 152 and a ring member 211, which in turn is connected by a toothed face coupling 212 with a ring 213 that is permanently secured to the work spindle 121. The ring member 211 allows for different feed positions along the work axis during the cutting process. At the end of depth feed is in its topmost position shown. It partakes in depth feed but has no clapping motion. Its vertical position is controlled by a screw 214 that engages a stationary internal thread 215 of the same lead and hand as the thread 137. It is axially fixed to the screw 214 while being rotatable thereon. The screw 214 turns with the sleeve 136 and is constrained to do so by a sliding spline connection 219 with the lower part of the member 136.

The more the pitch angle of the gear blank differs from a right angle, the more it is desirable to add a turning motion about the axis of the work spindle to the displacement along said axis, both in the feed motion and in the clapping motion. This makes it possible to move both sides of the spiral teeth about equally towards and away from the tools. The motion is then helical. A helical feed is achieved by making the splines 210 helical. The lead of these splines is identical with the lead of the desired motion.

Immediately before the start of each cutting stroke the work piece is advanced axially into cutting position so that the face coupling 212 is engaged. The work stays in that position during the cutting stroke. At the end of the cutting stroke, it is withdrawn axially either in a straight or in a helical path. This is the clapping motion effected by the cams 200. The face coupling 212 is disengaged at the end of the working stroke and is re-engaged at or just before the start of the cutting strokes. During the return strokes the work holder 121 moves independenly of the oscillator member 152. Its motion is then controlled by a shaft 216 coaxial with, and mounted within the work spindle 121. Shaft 216 is connected with the work spindle by a gear shaped coupling member 218 which is rigid with the shaft 216. The teeth of this member 218 engage internal teeth or splines 220 provided on the hollow work spindle, so as to achieve a sliding spline connection. The teeth and splines 220 are straight as shown, when the teeth 210 are straight, to permit straight reciprocation of the work holder. When the teeth 210 are helical and compel a helical feed motion, then the teeth and splines 220 are also helical. They have the same lead and hand as the teeth 210.

Figure 2:
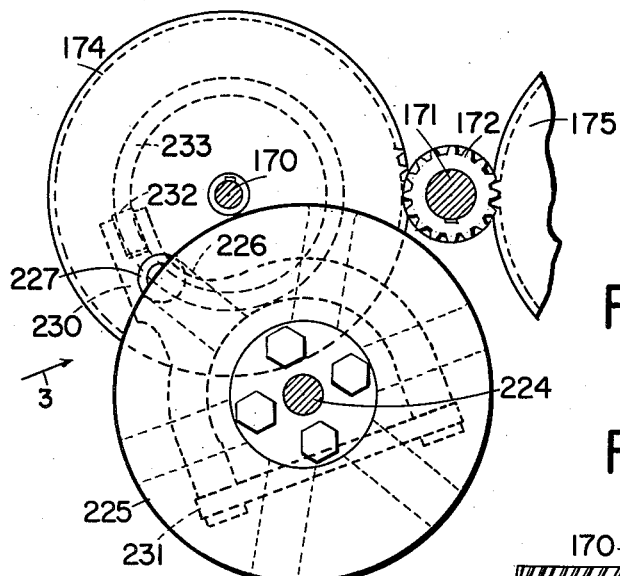
FIG. 2 is a fragmentary section taken on the line 2—2 of FIG. 1 looking in the direction of the arrows.
Figure 3:
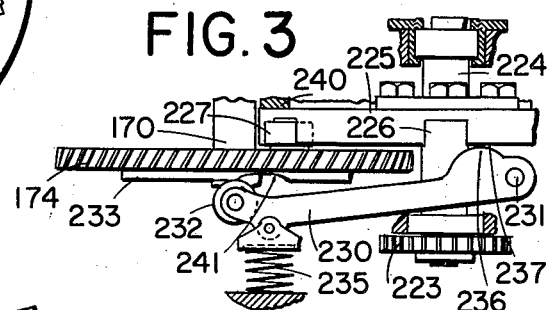
FIG. 3 is a part elevational view, part sectional view taken in the direction of the arrow 3 of FIG. 2 and through stationary supporting parts.

At its upper end, the shaft 216 has a disc portion 221 to which is rigidly secured an index change gear 222. This gear meshes with an idler gear (not shown) that in turn meshes with a change pinion 223 (FIG. 3). Pinion 223 is secured to the shaft 224 of a Geneva wheel 225 (FIGS. 2 and 3). This wheel has six radial slots 226 engageable by a roller or pin 227 which is mounted eccentrically on the gear 174. FIGS. 2 and 3 show the roller 227 in a position entering one of hte slots 226. This position corresponds to the beginning of the return strokes of the tool slides, while FIGS. 1, 4, 5 and 6 show the position at the middle of the cutting stroke. A lever 230 (FIGS. 2 and 3) is pivoted adjacent one end at 231 and carries at its opposite end a roller 232. This roller engages a face cam 233 provided on the bottom side of the gear 174, under pressure of a spring 235 (FIG. 3). The rounded portion 236 on the lever 230 is adapted to engage the lower end face 237 of the Geneva wheel 225 to press the wheel axially against a stationary rim 240 and to thereby clamp it. The pressure is applied by spring 235 in a constant manner and with sufficient force when the roller 232 is in a recess 241 of the cam.

In the position shown the Geneva wheel 225 has just been unclamped by the cam 233 moving the roller 232 down and lowering portion 236. Such frictional clamping requires a minimum of displacement and is sufficient since the parts are under no appreciable load when clamped. However, positive locking may be used if desired.

A duplicate indexing drive is provided for operation by a roller 227 mounted on the gear 175.

During the cutting stroke, the roller 227 is clear of the Geneva wheel 225. Even at the ends of the cutting strokes, that is, at the end positions of the oscillatory member 152, the roller 227 is still somewhat short of engagement with a slot 226 of the Geneva wheel. At said ends, the clapping motion starts or ends. This moves the clutch ring 213 axially while the work spindle is angularly stationary. The lever 230 serves to keep the work spindle at a standstill until the indexing roller 227 enters a slot 226 of the Geneva wheel 225. From then on to the end of the indexing operation, the position of the Geneva wheel is controlled by the roller 227. Since the Geneva wheel is geared to the central shaft 216, and since the work spindle turns with this shaft, the work holder 121 is indexed during the return stroke of the tool slides. This indexing motion is preferably in the same direction as the return oscillation of member 152 and differs by the one angular pitch of the gear blank from said return oscillation. It may be one pitch smaller or one pitch larger than the latter, to index the work in either direction. It should be noted that the motion provided by the Geneva wheel does not need to be an integral number of pitches; but it should differ from the angular working stroke of the work spindle by exactly one pitch.

During the cutting stroke, the Geneva wheel remains geared to the shaft 216 and to the work holder and turns in time with it. It does not stand still. It stands still only for the brief periods of return stroke between the ends of the stroke and the time of engagement of the actuating roller 227 with the Geneva wheel.

The feed worm 143 is slowly rotated by a feed train driven from a pinion 250 rigidly secured to shaft 186. Pinion 250 drives a gear 251 rigid with a shaft 252. From there the drive is through change gears, one of which is shown at 253 (FIG. 1), a releasable coupling, and reduction gearing (not shown) to the worm 143. Between the cutting of one gear blank and the start of cutting on a new blank, the worm 143 is turned back to its initial position, preferably by known automatic means.

Tool slides 153, 153', etc. are movable in guideways 255 of a common stationary guide member 256 that is rigidly secured to the machine frame 120 by screws 257.

To sharpen the tools, the common guide member 256 is removed together with the tool slides and tools. Another guide member containing sharpened tools may be held in readiness and substituted, if desired. In this way the machine does not have to stand idle long.

To unload the work after a gear has been cut, the shaft 260 is moved up to the dotted position 260' (FIG. 1) by hydraulic means, for instance, so that the square end 261 of the shaft 260 engages a square hole provided in the bolt 130. A fractional turn of the shaft 260 then disengages the interrupted thread 132 so that the end part 125 with the gear 122 is freed, and can be lowered with the shaft 260. The gear can then be removed and another part 125 with a new gear blank secured thereto may be placed on the upper end flange of the shaft 260.

To load, the shaft 260 with the new part 125 and the new gear blank is raised again to bring said part 125 into engagement with the toothed coupling 127. The connection is then tightened by turning the bolt 130. After tightening, the shaft 260 is again lowered to the position shown in full lines in FIG. 1.

The teeth may be cut from the inside out or from the outside in; or one member may be cut from the inside out and the mating member of the gear pair may be cut from the outside in. One or more cutting teeth may be used per tool slide. When two cutting teeth are used, one of them is preferably designed to take an end cut and the other a side cut. The cutting teeth are so placed that the end cutting tooth cuts first in a tooth space and the side cutting tooth of the same tool slide goes through that same space in the next cutting stroke. The side cutting tooth cuts on one side of the gear tooth only. The opposite sides of the teeth are cut by the tools of the adjacent slides. The tool slides for cutting one side of the teeth alternate preferably with the slides for cutting the opposite sides of the teeth.

Figure 8:
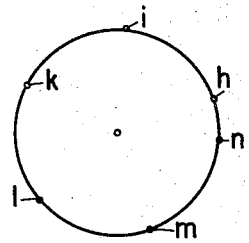
FIGS. 7 and 8 are diagrammatic views explanatory of the disposition of the tool slides.
Figure 7:
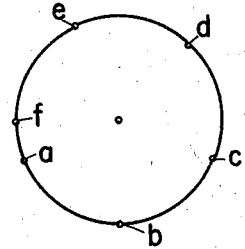

FIG. 7 indicates diagrammatically how the tool slides for cutting one side of the tooth are angularly spaced about the axis of the work holder in the embodiment now to be described. The slides and their guideways are spaced apart an integral number of pitches. The spacing is constant, except for one spacing. In this figure the condition is illustrated for cutting a gear having thirty-seven teeth. The guideways $a$, $b$, $c$, $d$, $e$, $f$ are spaced seven teeth apart, while the guideways $f$ and $a$ are spaced two teeth apart. FIG. 8 refers to the opposite sides of the teeth. Here, similarly, the ways $h$, $i$, $k$, $l$, $m$, $n$ are spaced seven teeth apart, and the ways $n$ and $h$ are spaced two teeth apart.

Figure 9:
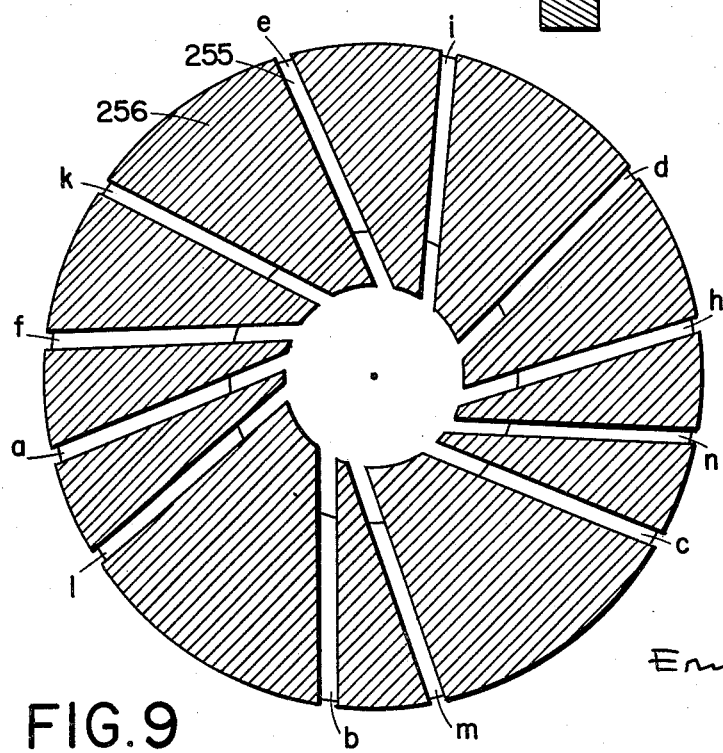
FIG. 9 is a section looking downwardly at the surface of revolution containing the guideways of the tool slides.

FIG. 9 is a section of the common guide member taken along the guideways and looking downwardly in the direction of its axis. Its guideways $a$, $b$, $c$, $d$, $e$, $f$ and $h$, $i$, $k$, $l$, $m$, $n$ are the guideways diagrammatically indicated in FIGS. 7 and 8 superimposed on each other. Adjacent ways, such as $c$, $n$ and $c$, $m$, are differently spaced apart.

In operation, the gear blank is indexed in effect by one tooth between successive cutting strokes. The depth feed also proceeds with each stroke until full depth is reached and then comes to a stop. Referring to one side of the teeth at a time, the chip thickness increases the more the greater the number of strokes between successive engagements of that side of a tooth space.

If the gear blank is indexed so that the cut of the tool moving in the guideway $b$ comes after the cut of the tool moving in the guideway $a$, the tools in the ways $b$, $c$, $d$, $e$, $f$ all take a full cut that corresponds to an interval of seven strokes. The tool in way $a$, however, takes less than a full cut since it is only two strokes apart from the preceding tool in the guideway $f$. Its chip is only about $2/7$ as thick as the other chips.

Preferably the side cutting tool in the way $a$ is a finishing tool that applies the final cut to all the teeth. To this end, both cutting teeth held by this tool slide are designed as side cutting teeth, since there is not much end cutting left to be done. The cutting tooth that precedes in the cut is provided with a side cutting edge that stands out very slightly over the other side cutting edges when cutting without feed. It may stand out laterally by 0.0015″ on say an eight inch gear. This is possible without undue wear because the depth feed is only slight, about $2/7$ of the regular depth feed between cuts. The second cutting tooth carried by the same tool slide has the final finish cutting edge. This edge stands out laterally somewhat more. It may stand out 0.001″ laterally beyond the edge of the first cutting tooth of the tool slide, and 0.0025″ beyond the other cutting edges.

When the feed drive is disengaged and the depth feed ceases, the two last-named side cutting edges semi-finish and finish, respectively, one side of all the teeth as the cutting strokes and indexing go on.

The opposite side of the tooth is cut in the same way. Here, the semi-finishing edge and the finishing edge are provided on the slide moving along the guideway $h$.

The machine is stopped when the last tooth is finished, preferably in known automatic manner. It completes the gear from the solid, first roughing it, and then finishing it.

While a particular means for effecting depth feed has been described, the depth feed might also be cam-operated, if desired. Other tool dispositions are also feasible. Thus, I may use two slides with end cutting tools alternating with slides that contain side cutting tools.

Figure 11:
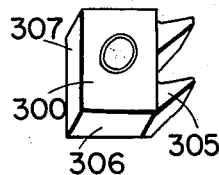
FIGS. 10 and 11 are corresponding views of a tool secured to one end of a tool slide.
Figure 10:
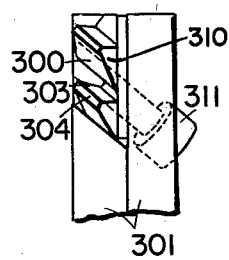

FIGS. 10 and 11 show a tool 300 secured to the end of a tool slide 301 to cut from the outside in, that is, from the outer ends of the teeth to their inner ends. The tool 300 has two cutting teeth which are relieved on their sides 303 and their tops 304, and which are sharpened by regrinding their cutting faces 305.

The cutting edges should stay constant and always move in the same path. After regrinding, the cutting faces 305 of the tool 300 should be laterally adjusted. This may be done along the side and bottom of the tool that extend in the direction of relief. The relief may be straight, as shown, or curved. Matching surfaces are provided on the tool slide 301 to permit adjustment in the direction of relief. No further adjustment is then needed to maintain the cutting edges in the same place after sharpening as before.

To sharpen, the tool 300 is advanced in the direction of relief. A parallel 310 of increased thickness is substituted for the parallel shown; and the tool is drawn tightly against the parallel by the screw 311. This screw has an internal hexagonal recess in its head for turning it. Then an amount of metal is ground off the cutting face of the tool, equal to the difference in thickness of the two parallels. This places the cutting face and edge of the tool in its original position.

Figure 12:
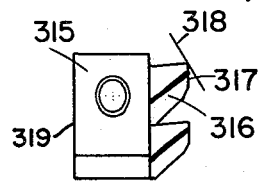
FIG. 12 is a view similar to FIG. 10 but showing a tool having a different type of relief from the tool of FIGS. 10 and 11.

FIG. 12 shows a tool 315 similar to the tool 300 but provided with different relief surfaces 316 and 317. Here the relieved top surfaces 317 of the cutting teeth are in planes parallel to the plane of the bottom surface 319 of the tool. Such relieved surfaces may be used on hypoid gears with ample shaft offset when the cut is in a direction like inclined line 318 because then the top surfaces 317 have clearance relative to the line of cut 318.

Figures 13, 14:
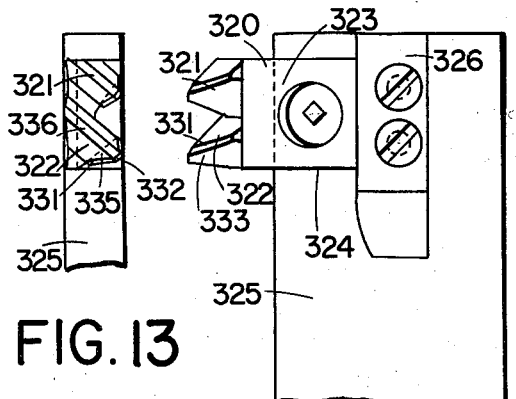
FIGS. 13 and 14 are corresponding views of a tool of still another type, a tool such as may be sharpened by contour grinding, that is, by regrinding the sides and tops of the cutting teeth.
Figure 15:
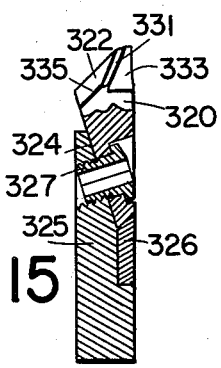
FIG. 15 is a transverse section taken at right angles to the views of FIGS. 13 and 14.

FIGS. 13, 14 and 15 illustrate a tool 320 that needs no lateral adjustment in spite of the inclination of its cutting teeth to the direction of tool travel across the gear face. Tool 320 has cutting teeth 321, 322 projecting from a body portion 323. The tool body rests in an inclined slot 324 of the tool slide 325, its lower end contacting an insert 326. A screw 327 maintains the tool body pressed against the tool slide 325. The cutting teeth 321, 322 are contour ground. Each tooth may have a constant cutting face 333 whose surface should contain the curvature circle of the curved cutting edge. Of course, straight cutting edges can also be used. The cutting teeth are sharpened by regrinding the contour, that is, the lands 331, 332 at the sides and tops.

As the tools are repeatedly sharpened, the cutting edge is displaced on the cutting face. The latter may be made a cylindrical surface whose straight line elements are either parallel to the axis of the work holder, or are parallel to a plane laid through the direction of tool travel parallel to the work axis. The cutting face could also be a plane parallel to the work axis, especially when the tool has straight cutting edges. In all such cases, the cutting edge is displaced through sharpening in a direction requiring no lateral adjustment. The displacement is axially of the gear blank and in some instances also in the direction of the tool motion. It can be taken up by adjusting the feed along the axis of the work spindle, and, if required, by a simultaneous adjustment of the tool slide positions. The latter adjustment can be effected by an angular adjustment of the common guide member 256 about the work axis.

With each sharpening, the lands 331, 332 become wider. From time to time, then, the rear portions 335, 336 of the cutting teeth should be reground, as is customary with contour grinding.

On tools 300, 315, 320 with a concave cutting edge formed at the intersection of a side surface with a cutting face, the cutting face preferably differs from a plane and is curved. The curvature plane of the cutting edge at a mean point is inclined to the cutting face at said point. The inclination angle is preferably larger than 30°.

While several different embodiments of the invention have been described, it will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for cutting spiral teeth on gears with form cutting tools, comprising a rotatable work support for a gear blank, a reciprocatory tool slide movable at an angle to the axis of the work support, means for reciprocating said tool slide and for simultaneously turning said work support on its axis in timed relation with each other to effect cutting of longitudinally curved teeth on the gear blank, the last named means including a part coaxial with the work support and fixed relative to the work support during cutting strokes of the tool slide, means for connecting and disconnecting said part to and from said work support at the ends of the strokes of the tool slide, and an operative connection between said part and said tool slide, and means for feeding said tool slide relative to said work support to cut progressively deeper into the gear blank.

2. A machine for form-cutting spiral teeth on gears, comprising a rotary work support for holding a gear blank, a reciprocatory tool slide movable at an angle to the axis of said work support, means for reciprocating said tool slide and for simultaneously turning said work support on its axis in direct proportion to the displacement of said tool slide to effect cutting and return strokes, the last named means including an oscillatory member coaxial with the work support, an operative connection between said member and said tool slide, and means for rigidly connecting said member with said work support to turn therewith during the cutting strokes and for disconnecting said member from said work support during the return strokes, and means for effecting a clapping motion and a feed motion between said tool slide and said work support in the direction of the axis of said work support.

3. A machine for form-cutting spiral teeth on gears, comprising a rotary work support for a gear blank, a reciprocatory tool slide movable at an angle to the axis of said work support, means for reciprocating said tool slide and for simultaneously turning said work support on its axis in timed relation with the reciprocation of said tool slide to effect cutting and return strokes, the last named means comprising a toothed member coaxial with said work support, teeth rigid with said slide and engaging said toothed member, means connecting said toothed member to and disconnecting it from said work support, and means for oscillating said toothed member, means for feeding said work support relative to the tool slide axially of said work support, means for clapping said work support axially, and means for periodically indexing said work support.

4. A machine for form-cutting spiral teeth on gears, comprising a rotary work support for a gear blank, a reciprocatory tool slide movable at an angle to the axis of said work holder, means for reciprocating said tool slide and for simultaneously turning said work holder on its axis in timed relation with the reciprocation of said tool slide to effect cutting and return strokes, the last named means comprising a member coaxial with said work support, means for oscillating said member once per cycle of a cutting and a return stroke, means operatively connecting said member with said tool slide to reciprocate said tool slide upon oscillation of said member, and means for connecting said member to and disconnecting it from said work support, means for feeding said work support axially, means for moving said work support axially to effect clapping of said work support relative to said tool slide, and means for indexing said work support during each return stroke while said member is disconnected from said work support.

5. A machine for form-cutting spiral teeth on gears, comprising a rotary work support for a gear blank, a reciprocatory tool slide movable at an angle to the axis of said work support, means for reciprocating said tool slide and simultaneously turning said work support on its axis in timed relation with one another to effect cutting and return strokes, the last named means comprising a member coaxial with said work support, means for oscillating said member once per cycle consisting of a cutting and a return stroke, an operative connection between said member and said tool slide to reciprocate said tool slide upon oscillation of said member, and means for connecting said member to and disconnecting it from said work support, means for feeding the work support and tool slide relative to one another and for clapping the work support and tool slide relative to one another, and means for turning said work support during the return strokes relative to said member so that a different tooth space is engaged by a tool mounted on said tool slide on successive cutting strokes.

6. A machine for form-cutting spiral teeth on gears, comprising a rotary work support for a gear blank, a plurality of reciprocatory tool slides, a common guide member having guide ways in which said tool slides are guided and which are angularly disposed to the axis of said work support, means for reciprocating said tool slides and for simultaneously turning said work support on its axis in timed relation with each other to effect cutting and return strokes, means for feeding said work support along its axis, means for clapping said work support along and about its axis, and means for periodically indexing said work support.

7. A machine for form-cutting spiral teeth on gears, comprising a rotary work support for a gear blank, a plurality of reciprocatory tool slides for carrying roughing and finishing tools, a common guide member having guide ways which are angularly disposed to the direction of the axis of said work support and which are spaced angularly about said axis, some of the angular spacings being unequal, the smaller spacing being for a finishing tool to reduce its chip load, means for reciprocating said tool slides and for simultaneously effecting relative turning motion between said tool slides and said work support about the axis of said work support in timed relation with each other to effect cutting strokes, means for effecting depthwise feed between said tool slides and said work support, means for effecting a clapping motion between said tool slides and said work support, and means for indexing said work support.

8. A machine for form-cutting spiral teeth on hypoid gears, comprising a rotary work support for a gear blank, a plurality of reciprocatory tool slides for holding tools, a common guide member having guide ways angularly disposed to the axis of said work support and offset from said axis, said guide ways being spaced about said axis and forming two groups, each of said groups containing a plurality of equally spaced guide ways generally alternating with the guide ways of the other group and each of said groups having one pair of guideways that are spaced from one another at a distance less than the spacing of the other guideways of the group, means for reciprocating said tool slides to effect cutting and return strokes, means for turning said work support on its axis in timed relation with the cutting strokes of the tool slides, means for effecting feed between said tool slides and said work support axially of said work support, means for effecting a clapping motion between said tool slides and said work support at the end of the cutting strokes of the slides to disengage the tools from the workpiece, and means for periodically rotatably indexing said work support.

9. A machine for form-cutting spiral teeth on gears, comprising a rotary work support for a gear blank, a plurality of reciprocatory tool slides for carrying tools, a common guide member having guideways for guiding said tool slides in their reciprocation, said guideways being angularly disposed to the axis of said work support, means for reciprocating said tool slides to effect cutting and return strokes, means for simultaneously turning said work support on its axis during the cutting strokes of said tool slides and in timed relation therewith, the last named means including an oscillatory member coaxial with said work support, a common drive shaft, a pair of shafts extending parallel to the axis of said work support and disposed on opposite sides thereof, means for driving said pair of shafts from said common drive shaft, and means operatively connecting each of said pair of shafts and said oscillatory member to oscillate said member upon rotation of said shafts, and means for effecting feed and a clapping motion between said tool slides and said work support.

10. A machine for form-cutting spiral teeth on gears, comprising a rotary work support for a gear blank, a plurality of reciprocatory tool slides for carrying tools, a common guide member having guide ways to guide said tool slides, said guide ways being angularly disposed to the axis of said work support, means including an oscillatory member coaxial with said work support for reciprocating said tool slides and for simultaneously turning said work support on its axis in timed relation with said tool slides to effect cutting strokes, an oscillatory counterbalance member coaxial with said work support, means for oscillating said counterbalance member, means for effecting feed between said work support and said tool slides, means for effecting a clapping motion between said tool slides and said work support, and means for periodically indexing said work support.

11. In a machine for form-cutting spiral teeth on gears, a rotary work support for a gear blank, a plurality of reciprocatory tool slides spaced about the axis of said work support, guide ways for constraining said tool slides to move in different directions inclined to the axis of said work support, an oscillatory member coaxial with said work support, and means operatively connecting said oscillatory member to said tool slides for reciprocating said tool slides in their different directions upon oscillation of said member, the last-named means including a pair of shafts parallel to the axis of said work support, a drive element attached to each of said shafts adjacent one end thereof for engagement with said oscillatory member, a common drive shaft, a herringbone pinion coaxial with said drive shaft and turning with it while floating axially, and a pair of helical gears of opposite hand, respectively, rigid, respectively, with the two shafts of said pair, said gears meshing, respectively, with opposite halves of said herringbone pinion, so that the two shafts of said pair are constrained to transmit equal torque.

References Cited in the file of this patent

UNITED STATES PATENTS

| | | |
|---|---|---|
| 1,202,456 | Uhlmann | Oct. 24, 1916 |
| 1,306,331 | Fellows | June 10, 1919 |
| 1,335,864 | Stevenson | Apr. 6, 1920 |